3,031,432
PROCESS FOR PREPARING POLYSTYRENE AND BLOCK COPOLYMERS OF POLYSTYRENE IN THE PRESENCE OF AN N-ALKYL LITHIUM CATALYST

Roland J. Kern, Dayton, Ohio, assignor to Monsanto Chemical Company, St. Louis, Mo., a corporation of Delaware
No Drawing. Filed Feb. 29, 1960, Ser. No. 11,444
9 Claims. (Cl. 260—45.5)

This invention relates to a method for polymerizing styrene.

It is an object of this invention to provide an improved process for polymerizing styrene to the polymeric form.

It is further an object of this invention to provide a new form of polymeric styrene.

Polystyrene is an important material in the plastic arts, having found extensive use in the form of molded products having a great variety of uses.

A low-molecular weight polystyrene has been prepared from monomeric styrene by subjecting the latter to temperatures below 10° C. and also below −33° C. in the presence of a variety of so-called polymerization catalysts, initiators or activators. Among these are the alkali-forming salts of an acid having a pKa of at least 15, such salts being generally described by Hammett, Physical Organic Chemistry, McGraw-Hill (1940), pages 48–50, by Conant et al. JACS 54, page 1212 (1932), by McEwen, ibid., 58, page 1124 (1936), or by Branch and Calvin, Theory of Organic Chemistry, Prentice-Hall, pages 183–270 (1936).

Polystyrene is one of the most important polymers of commerce, being widely used in a variety of applications, and especially in the form of molded objects. It is known to polymerize styrene in the absence of added catalysts, by free radical catalysis such as by peroxy compounds and also by polymerization in solvents, in mass or bulk, and by emulsion or suspension techniques. The presently known polystyrene possesses certain objectionable features among the most important of which are a low softening temperature or heat distorting point and a very limited transition range; i.e., it changes from a hard, rigid solid to a soft material on up to and essentially melted material over a temperature range of a very few degrees centigrade.

Polystyrene produced by the present process is particularly adapted for the manufacture of injection or compression molded articles, and also for extrusion and use in other methods of forming plastics into films, fibers, tubes and other shapes. It can, of course, be formulated with various pigments, dyes, fillers and other polymers and the like as may be desired to impart particular desired characteristics. It can be drawn into fibers in which case the high molecular weight variety herein obtained are especially desirable by reason of its greater strength and elongation. Moreover, films can be obtained by unidirectional or bidirectional stretching, thus obtaining greatly increased strength for a multitude of purposes.

Polystyrene when prepared by the present process, while generally useful for the same purpose as conventional polystyrene, possesses an additional important and useful property. Solutions of the present polystyrene prepared in aromatic solvents exhibit a concentration-viscosity relationship indicating the possible presence of certain active groups in the polymer chain. If concentration values are plotted against viscosity values, the curve drawn through such values passes through a minimum after which it rises steeply as the concentration is increased. Thus, when employing solutions of polystyrene having a concentration in the neighborhood of the minimum value, considerably higher concentrations can be obtained in the solution without encountering excessively high viscosities.

I have now found that monomeric styrene may be polymerized at temperatures above 10° C. and preferably above 20° C. by simply contacting the same with an n-alkyl lithium compound wherein the alkyl radical has not in excess of five carbon atoms. Alkyl lithium compounds which are useful for the present purpose are methyl lithium, ethyl lithium, n-propyl lithium, n-butyl- and n-amyl lithium. Mixtures of these n-alkyl lithium products may also be used.

The n-alkyl lithium catalyst is prepared by contacting lithium metal with the desired n-alkyl halide either at room temperature or at elevated (40°–120° C.) temperatures, including reflux temperatures obtained by refluxing the solvent at ordinary pressures. Usually a non-reactive solvent such as benzene or hexane is conveniently employed. When reacting lithium metal with the alkyl halide at room temperature, a mouse-gray reaction product, consisting of a slurry of solids suspended in the solution, is obtained, a conversion, in the case of the butyl lithium, of about 80% of theory being obtained in approximately two hours. When carrying out the reaction in refluxing hexane, the conversions are somewhat higher, the reaction product in this case also being a slurry but possessing a bright purple color.

In either case the reaction slurry can be separated by filtration into a solution and a solids fraction. Both fractions possess a pronounced ability to polymerize styrene and both may accordingly be employed to the same end as will be apparent from the following description. If desired, the solid component of the slurry may be separated from the soluble components and these solid components separately employed. A somewhat higher molecular weight of polystyrene is obtained when using the separated reaction solids than when using the solution per se. In either case the molecular weight of the polystyrene may be at least as high as polystyrene made in the conventional manner using the known peroxy catalysts.

The preparation of the above-mentioned alkyl lithium compounds may be carried out in any inert organic solvent. Suitable solvents may be saturated aliphatic, alicyclic or aromatic hydrocarbons, halogenated hydrocarbons and saturated ethers. By way of example, I may mention the following: liquefied propane, isobutane, normal butane, n-hexane, the various isomeric hexanes, cyclohexane, methylcyclopentane, dimethylcyclohexane, dodecane, industrial solvents composed of saturated or aromatic hydrocarbons such as naphthas, etc., especially those which have been hydrogenated to remove any olefinic compounds; also benzene, toluene, ethylbenzene (for which purpose the mixture of ethylbenzene and styrene obtained by the catalytic dehydrogenating process may serve as a convenient and economical source of styrene), decalin, ethylene dichloride, chlorobenzene, diethyl ether, orthodichlorobenzene, dibutyl ether, tetrahydrofuran and dioxane.

This catalyst is unusual in that it induces polymerization of styrene at a high rate and at the same time gives a high molecular weight polystyrene. It is common knowledge in the art that catalysts which promote polymerization at high rates generally produce resins of low molecular weight.

The polymerization of styrene, according to the present invention, is carried out in the presence of or in the absence of solvents at temperatures above +10° C. and desirably above +20° C. and may even range as high as 120° or 130° C. During the polymerization, boiling of the polymerizing mixture may take place by reason of the liberation of heat of polymerization. The temperature which is attained during the reaction will depend upon the boiling point of the mixture of solvent, if one is used, and monomeric styrene present during the reaction and upon the pressure under which the reaction is carried out. The temperature may be lowered if desired by reducing the pressure below normal atmospheric pressure and may be raised by applying super-atmospheric pressures to the system. Thus, by making a suitable choice of solvent having the appropriate boiling point under the pressure at which it is desired to operate, a wide range of polymerizing conditions may be realized. By conducting the polymerization in a vessel provided with a reflux condenser, excess heat may be easily removed and the solvent and polystyrene retained in the reaction vessel.

The initial reaction of the n-alkyl lithium with the styrene monomer causes a series of color changes to take place which are quite marked and which may be used as a means for controlling the amount of catalyst necessary to induce polymerization. If the addition of the alkyl lithium solution is made drop-wise to monomeric styrene, the first few drops of solution added cause the formation of a pale green color. As the catalyst addition is continued, the solution becomes yellow, then orange and then becomes darker, reaching a reddish orange color. When this latter color becomes visible, the polymerization generally starts at a rapid rate. Heat is liberated and the reaction mixture may boil. As heat is lost either by evaporation of solvent or styrene, or by external cooling, such boiling gradually subsides and the polymerization is generally complete.

When this stage is reached, the polymer may be worked up by adding benzene or other solvent to the solution to dissolve the polymer, filtering the solution to remove any suspended solids, after which the solution is poured into methanol. The polymer precipitates and is recovered by filtration from methanol as a pure white resinous to fibrous solid material. The above treatment with methanol, of course, destroys or removes the catalyst residues attached to the polymer chains. The catalyst need not, however, be destroyed by this procedure but may be employed in a further succeeding polymerization and in this manner the so-called "block polymer" obtained. Thus, certain monomers among which are styrene, vinyl toluene, acrylonitrile and methacrylonitrile may be added to the polystyrene originally produced by means of the n-alkyl lithium catalyst and these monomers will attach themselves to the already formed polystyrene and thus form higher molecular weight polymers. Of course, the addition of styrene to an already formed polystyrene will not change the chemical nature of the resulting polystyrene although the molecular weight and those properties generally dependent thereon will be correspondingly altered. When, however, monomers, other than styrene, are added to polystyrene when produced as above, a uniquely different product is obtained. Thus, it is possible to produce a chain of polymerized styrene molecules to which is joined a chain of another polymer which in turn is joined to a chain of polystyrene molecules and a further chain of another polymer, etc.

Of course, it will be realized that the catalyst itself is uniquely sensitive to impurities such as oxygen, water, $CO_2$, CO, sulfur compounds, acetylene and groups containing reactive hydrogen atoms such as alcohols, acids, amines, etc., and it is, therefore, important that any such impurities present either in the solvents or monomers be carefully and completely removed therefrom. Purification may be accomplished by contacting the solvents and monomers with alkali metals such as sodium or with hydrides such as calcium hydride.

The concentration of the n-alkyl lithium solution or slurry with which the styrene is to be treated may vary over wide limits. Because of the activity of these initiators, the use of dilute solution is generally indicated. Usually solutions or slurries containing from 0.1% to 10% by weight or more may be utilized.

The amount of catalyst or initiator required is also somewhat variable and will depend upon the rate at which the polymerization reaction is to be conducted which in turn will depend upon the ease or facility with which heat can be removed from the reacting mass. Usually from 0.01% up to 10% of the n-alkyl lithium compounds, based on the weight of the styrene, may be employed.

Copolymers of styrene and other ethylenically unsaturated compound can be made with equal facility by my process. By this means copolymers of styrene with acrylonitrile, methacrylonitrile and vinyl toluene can be prepared. The procedure, when preparing such copolymers, consists in simply combining the n-alkyl lithium catalyst with the mixed monomer in the same manner as when the styrene homopolymer is prepared.

The following specific examples are given by way of illustrating the various methods and some of the variations thereof by which my invention may be practically carried out. The preparation of the alkyl lithium initiator was carried out in a glass apparatus in which provision was made for exclusion of atmospheric air and moisture by purging with lamp-grade nitrogen. The apparatus employed made possible the reaction of the lithium metal with the n-alkyl halide at room temperature and also at elevated; e.g. (refluxing) temperatures. In both cases stirring of the reaction mass was employed by providing a magnetic stirrer in the reaction vessel. The resulting reaction product of lithium metal and alkyl halide could be added, if desired, directly to monomeric styrene or the initiator reaction product could first be filtered and then either the filtrate or the solids separately added to the monomer. Addition of styrene to the catalyst may also be carried out. The polymerization reactor was provided with a refluxing condenser so that boiling of the product would not result in a loss of solvent or monomer.

*Example 1*

An amount of lithium metal weighing 0.05 g. was reacted with 0.34 g. of n-butyl chloride in 3 cc. of hexane, employing stirring at room temperature. Then 12 cc. more of hexane was added. The hexane solution was decanted and filtered through a sintered glass filter after which it was still somewhat turbid. 5 cc. of this hexane solution was added to styrene monomer whereupon an orange color developed and in about one minute after addition the styrene polymerized rapidly.

Monomeric styrene was added to the hexane washed residue of solids which had been removed by decantation from the initiator reaction product. The solids flocculated in the styrene in about two minutes. No color developed. After about twenty-four minutes rapid polymerization occurred with boiling of the styrene. The polystyrene was recovered by the addition of benzene followed by precipitation in methanol. The polystyrene recovered from the methanol was dissolved in benzene and the viscosity of a series of solutions thereof measured. The relationship between the concentration and the specific viscosity of the polystyrene obtained is given in the following tabulation.

| Concentration, percent: | Specific viscosity |
|---|---|
| 0.05 | 2.22 |
| 0.10 | 2.05 |
| 0.15 | 2.04 |
| 0.20 | 2.10 |
| 0.3 | 2.25 |
| 0.4 | 2.40 |
| 0.5 | 2.55 |
| 0.6 | 2.74 |
| 0.8 | 3.10 |
| 1.0 | 3.45 |

It will be noted that the viscosity characteristic differs considerably from that exhibited by ordinary polystyrene. The present polystyrene exhibits a concentration-viscosity curve which passes through a minimum, then rising to values which are considerably higher than ordinary polystyrene.

By means of the well known Huggins equation:

$$\frac{\eta sp}{c} = [\eta] + k'[\eta]^2 c$$

the molecular weight of the polystyrene prepared in this example can be calculated. By substituting 0.35 for the constant $k'$, as determined for polystyrene in benzene by Alfrey, Goldberg and Price in the Journal of Polymer Science, vol. 5, page 254 (1950), and by using the above-determined specific viscosity of 2.05 at 0.10% concentration, the intrinsic viscosity can be calculated $[\eta]=1.88$. The relationship of specific viscosity and intrinsic viscosity to molecular weight is expressed by the equation $[\eta]=KM^a$ as explained in the book Styrene, Its Polymers, Copolymers and Derivatives, edited by R. H. Boundy, R. F. Boyer, and S. M. Stoesser, for the American Chemical Society Monograph Series, Reinhold Publishing Co. (New York, 1952). By using the values for $K=0.75 \times 10^{-4}$ and $\alpha=0.78$, for unfractionated polystyrene in benzene as provided in the Styrene Monograph, page 334, the molecular weight of the polymer is calculated to be approximately 440,000. These calculations indicate that the polymer prepared in this example has an exceptionally high molecular weight.

*Example 2*

An amount of lithium metal weighing 0.1 g. was combined with 0.68 g. of n-butyl chloride in 6 cc. of hexane for forty-five minutes at room temperature. 9 cc. of hexane was then added, and the hexane insoluble solids present allowed to settle. The solution was then filtered under nitrogen through a sintered glass filter and retained in a calibrated-addition tube for later use.

The insoluble solids, removed by filtration, were washed with three 15 cc. portions of hexane, the washings being decanted and discarded. 15 cc. of monomeric styrene was then added to the washed solids. About ten minutes after the addition of the solids, stirring being continued, the gray solids in the styrene had flocculated. After sixty minutes standing, violent polymerization occurred. The solids present were dissolved in benzene, the solution filtered and precipitated in methanol.

2 cc. of the hexane filtrate was added dropwise to 15 cc. of styrene, the first few drops giving rise to a grey-blue band in the styrene. More drops gave rise to a light orange-yellow color which faded in time. Further addition of the remainder of the 2 cc. caused the formation of a rich, deep orange layer. In about two minutes the styrene proceeded to polymerize in a controlled but rapid manner. Benzene was added to the viscous solution, the benzene solution was filtered and the polymer precipitated by addition to hexane.

*Example 3*

Lithium metal in amount of 0.2 g. was reacted with 0.68 g. of n-butyl chloride with 3 cc. of hexane by stirring and refluxing the same over a period of three hours. The slurry possessed a definite purple color. 12 cc. of hexane were added and the hexane solubles filtered off.

1 cc. of hexane filtrate, prepared as above, was added to 10 cc. of monomeric styrene, the styrene polymerizing rapidly. 5 cc. of benzene was added; then five drops of the hexane filtrate prepared as above. Vigorous polymerization again ensued. When the reaction was over, 10 cc. of dry methacrylonitrile was added without stirring. The polystyrene mass darkened slowly as the nitrile diffused into it. After the polymer mass was dissolved in benzene, it was filtered and precipitated in methanol. The polymer was recovered from the methanol and subjected to analysis. It contained 0.26% of nitrogen equivalent to 1% of methacrylonitrile polymer, the balance being styrene.

*Example 4*

An amount of lithium equivalent to 0.2 g. was reacted with 0.68 g. of n-butyl chloride dissolved in 3 cc. of hexane under nitrogen at a reflux temperature for three hours. A purple slurry was formed. More hexane (12 cc.) was added. The solids settled rapidly when stirring ceased. The hexane solution was filtered under nitrogen and employed in the following experiment.

3 cc. of the filtered hexane solution was placed in a polymerization reactor and styrene added dropwise while stirring the solution. The first two drops gave a definite color change. The next few drops gave a deeper orange. About 4 cc. more of styrene was added dropwise over a three or four minute period. The rich orange solution vigorously polymerized to give a viscous red solution. A mixture of 5 cc. of styrene and 5 cc. of dry benzene were then added. In only a few seconds the styrene polymerized violently, retaining the deep orange color. A second increment of styrene and benzene (5 cc. each) was then added whereupon the polymerization reaction again ensued, the solution boiling as heat was evolved. After one-half hour benzene was added to the solid mass, the solution filtered and the polymer precipitated and recovered from methanol.

1 cc. of the hexane filtrate solution, prepared as above, was added to 6 cc. of styrene dissolved in 9 cc. of benzene. Polymerization ensued. When reaction ceased, a mixture of 5 cc. of acrylonitrile dissolved in 5 cc. of benzene was added. The mixture turned darker in color, indicating acrylonitrile polymerization. After one hour the mixture was dissolved in benzene and acetone, filtered and precipitated in methanol. Analysis of the polymer gave 0.4% nitrogen equivalent to 1.5% condensed acrylonitrile polymer, the balance thereof being styrene.

*Example 5*

An amount of lithium metal equivalent to 0.025 g. was reacted with 0.17 g. of n-butyl chloride dissolved in 2 cc. of hexane for two hours at room temperature employing magnetic stirring of the reaction mass.

Acrylonitrile, which had been previously dried over calcium hydride, was mixed with styrene in the proportions of 5 cc. of acrylonitrile to 9 cc. of styrene. 11 cc. of benzene were added. The resulting solution was added to the n-butyl lithium slurry, prepared as above, through an addition funnel. The resulting solution polymerized immediately on contact with the catalyst explosively throwing light green polymer on the tube walls. A copolymer of styrene and acrylonitrile was recovered which was soluble in acetone.

*Example 6*

A 500 ml. reactor fitted with a rubber grommet was connected to a nitrogen manifold so that the reaction could be carried out in an oxygen-free atmosphere. The reactor contents were stirred by means of a 2-inch Teflon-coated magnetic stirring bar in conjunction with an electric magnetic stirrer. The charge consisted of 56 cc. of reagent grade dry diethyl ether and 21.0 g. (0.33 mole) of n-butyl lithium in 200 cc. pentane, injected by the use of a hypodermic syringe using a needle that punctured the rubber grommet. A hypodermic syringe was then used to add 34.3 g. (0.33 mole) of dry redistilled styrene monomer over a period of 1 hour at 25° C. The reaction mixture became a deep orange color and turned gradually to a clear wine-red. The temperature climbed slowly to about 40° C. and then dropped to 25° C. After the reactants had been stirred for 1 hour, 200 cc. of methanol containing 5 wt. percent concentrated HCl was added through a reflux condenser which was attached to the reactor. A vigorous exothermic reaction ensued. The mixture was transferred to a separatory funnel, the hydrocarbon layer was separated and washed with water. After the ether and pentane were stripped off, a fraction, 4.7 g., was distilled boiling at 44–47° C. at 0.5 mm. No further distillate was obtained even though the pot temperature was raised to 125° C. at 0.4 mm. The residue, weighing 34.0 g., was miscible in all proportions in hexane, diethyl ether, 2-ethylhexanol and acetone. The refractive index of the residue was $n_D^{25}$ 1.5680, while the normally accepted value for polystyrene is about 1.5910.

This example illustrates the fact that the combination of 1 mole of an alkyl lithium compound with 1 mole of styrene does not yield polymeric styrene. This example in its findings is confirmed by Ziegler et al., C.A. 45, 3637-3639 (1951), near the middle of column 3638. The original article was published in Ann. 567, 90 (1950). Ziegler identified hexylbenzene as a product obtained in this reaction.

*Example 7*

The reactor used in Example 6 was charged with 10 cc. of dry benzene and 0.5 cc. of n-butyl lithium solution, 16 wt. percent n-butyl lithium in heptane, equivalent to 0.052 g. n-butyl lithium. Dry styrene, 0.52 g., was then added to the magnetically stirred mixture through the rubber grommet seal by means of a hypodermic syringe and needle. A thick, orange-colored, syrupy solution was obtained. The solution was stirred for 25 minutes at 25° C. Its activity as a catalyst for the polymerization of additional styrene was checked by adding a solution of 10 g. styrene in 20 cc. benzene. Heat was evolved immediately and the clear bright orange solution gradually became more and more viscous. Stirring was continued for an additional 30 minutes. At this point a second addition of a solution of 10 g. styrene in 20 cc. benzene was made and again heat was evolved. After 30 minutes the product still retained activity to polymerize styrene, as evidenced by the evolution of heat when a third portion of 10 g. styrene in 20 cc. benzene was added. The product mixture was permitted to stand at 25° C. for 2 hours.

The viscous solution was diluted with 50 cc. of benzene and then poured into methanol. The voluminous precipitate of a white fibrous polymer which formed was removed by filtration, washed on the filter with methanol and dried at 50° C. High molecular weight solid polystyrene weighing 31.3 g. was recovered. This polymer was completely insoluble in hexane, 2-ethylhexanol, diethyl ether and acetone. When a sample of this product was compression molded, a clear flexible sheet was obtained.

This application is a continuation-in-part of my co-pending application, Serial No. 502,209, filed April 18, 1955.

While the invention has been described with particular reference to preferred embodiments thereof, it will be appreciated that variations from the details given herein can be effected without departing from the invention in its broadest aspect.

I claim:
1. The process for the preparation of polystyrene which comprises contacting styrene with 0.01% to 10%, by weight of said styrene, of an n-alkyl lithium compound having from 1 to 5 carbon atoms in the alkyl radical, at a reaction temperature above 20° C., and recovering polystyrene therefrom.

2. The process of claim 1 wherein the n-alkyl lithium compound is n-butyl lithium.

3. The process for the preparation of polystyrene having the capability of forming block polymers which comprises contacting styrene in an organic solvent with 0.01% to 10%, by weight of said styrene, of an n-alkyl lithium compound having from 1 to 5 carbon atoms in the alkyl radical at a temperature of at least 20° C.

4. The process of claim 3 wherein the polymerization temperature is from at least 20° C. up to the boiling temperature of the polymerization mixture.

5. A process which comprises contacting in an organic solvent, at a temperature at least above 20° C., styrene and an n-alkyl lithium compound, in which the alkyl radical has from 1 to 5 carbon atoms whereby a polymer is produced and then polymerizing a monomeric material selected from the class consisting of styrene, acrylonitrile, methacrylonitrile and vinyl toluene which said polymer.

6. The process which comprises contacting, at a temperature above 20° C., styrene and an n-alkyl lithium compound having from 1 to 5 carbon atoms in the alkyl radical, whereby polystyrene is produced and then polymerizing additional styrene monomer with said polystyrene.

7. The process which comprises contacting in an organic solvent, at a temperature above 20° C., styrene and an n-alkyl lithium compound having from 1 to 5 carbon atoms in the alkyl radical, whereby polystyrene is formed, then polymerizing acrylonitrile with said polystyrene.

8. The process which comprises contacting in an organic solvent, at a temperature above 20° C., styrene and an n-alkyl lithium compound having from 1 to 5 carbon atoms in the alkyl radical, whereby polystyrene is formed, then polymerizing methacrylonitrile with said polystyrene.

9. The process which comprises contacting in an organic solvent, at a temperature above 20° C., styrene and an n-alkyl lithium compound having from 1 to 5 carbon atoms in the alkyl radical, whereby polystyrene is formed, then polymerizing vinyl toluene with said polystyrene.

References Cited in the file of this patent

UNITED STATES PATENTS 2,608,555    Bullitt _____ Aug. 26, 1952

FOREIGN PATENTS 487,727    Germany _____ Jan. 7, 1930

OTHER REFERENCES

Hicks et al.: "A Flow Method for the Synthesis of Block Copolymers," Nature, volume 171, February 14, 1953, pages 300-301.